US012043397B2

(12) United States Patent
Daandels et al.

(10) Patent No.: US 12,043,397 B2
(45) Date of Patent: Jul. 23, 2024

(54) ATTACHMENT CONCEPT FOR A FAIRING ON AN AIRFOIL BODY SUCH AS A FLAP OR A WING OF AN AIRCRAFT

(71) Applicant: Airbus Operations GmbH, Hamburg (DE)

(72) Inventors: Dort Daandels, Hamburg (DE); Jörn Ewald, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/841,145

(22) Filed: Jun. 15, 2022

(65) Prior Publication Data
US 2022/0402623 A1 Dec. 22, 2022

(30) Foreign Application Priority Data
Jun. 18, 2021 (EP) ..................................... 21180194

(51) Int. Cl.
*B64D 29/06* (2006.01)
*B64C 3/28* (2006.01)
*B64C 9/02* (2006.01)

(52) U.S. Cl.
CPC ................ *B64D 29/06* (2013.01); *B64C 3/28* (2013.01); *B64C 9/02* (2013.01)

(58) Field of Classification Search
CPC .. B64D 29/06; B64C 3/28; B64C 9/02; B64F 5/10
See application file for complete search history.

(56) References Cited

U.S. PATENT DOCUMENTS

| 2,152,861 | A | 4/1939 | Bennett |
| 2010/0327121 | A1 | 12/2010 | Mcalinden et al. |
| 2012/0068016 | A1 | 3/2012 | Sauermann |
| 2014/0140820 | A1 | 5/2014 | Todorovic |
| 2015/0129714 | A1 | 5/2015 | Wei et al. |
| 2018/0141636 | A1 | 5/2018 | Currie et al. |
| 2019/0039713 | A1* | 2/2019 | Bennett .................. B64D 29/06 |
| 2019/0112027 | A1* | 4/2019 | Ahern ........................ B64C 9/02 |
| 2019/0300146 | A1* | 10/2019 | Tsai ........................... B64C 7/00 |
| 2020/0361619 | A1* | 11/2020 | Dickert .................... F16M 1/00 |
| 2021/0061437 | A1* | 3/2021 | Daandels .................. B64C 7/00 |

FOREIGN PATENT DOCUMENTS

| CN | 104343228 A | * | 2/2015 |
| EP | 2266877 A2 | | 12/2010 |
| EP | 2735708 A1 | | 5/2014 |
| EP | 3323712 A1 | | 5/2018 |

OTHER PUBLICATIONS

Machine translation of CN-104343228-A, Wang B, Feb. 2015 (Year: 2015).*
European Search Report; priority document.

\* cited by examiner

*Primary Examiner* — Tien Q Dinh
*Assistant Examiner* — Katherine June Bolek
(74) *Attorney, Agent, or Firm* — Greer, Burns & Crain, Ltd.

(57) ABSTRACT

An arrangement comprising an airfoil body, a junction mechanism for attaching the airfoil body to a support element of an aircraft, and a fairing for aerodynamically covering the junction mechanism. The fairing has a cover element covering a trailing end portion of the fairing. The cover element is attached to the trailing edge of the airfoil body by a form fit connection.

16 Claims, 6 Drawing Sheets

ATTACHMENT CONCEPT FOR A FAIRING ON AN AIRFOIL BODY SUCH AS A FLAP OR A WING OF AN AIRCRAFT

CROSS-REFERENCES TO RELATED APPLICATIONS

This application claims the benefit of the European patent application No. 21180194.9 filed on Jun. 18, 2021, the entire disclosures of which are incorporated herein by way of reference.

FIELD OF THE INVENTION

The invention relates to an arrangement comprising an airfoil body and a fairing for aerodynamically covering at least a part of a junction mechanism connecting the airfoil body to a support element of an aircraft. Further, the invention relates to an aircraft equipped with such arrangement and to a method for installing the fairing of such arrangement to the airfoil body.

BACKGROUND OF THE INVENTION

An airfoil body is a body having an airfoil as sectional shape. Aerofoils (or airfoils) have a characteristic shape with a rounded leading edge, followed by a sharp trailing edge, often with a symmetric curvature of upper and lower surfaces. The trailing edge of an airfoil body is the region having the maximum curvature at the end of the airfoil body. Examples for airfoil bodies of an aircraft are wings, control surfaces, and flaps. The airfoil bodies can be fixed structures or movable structures.

An aircraft fairing—referred to simply as fairing in the following—is a structure whose primary function is to produce a smooth outline and reduce drag. These structures are covers for gaps and spaces between parts of an aircraft to reduce form drag and interference drag, and to improve appearance. Conventional aircraft have several airfoil bodies in the form of control surfaces or high lift devices such as flaps which are movably linked to a support element by a junction mechanism wherein fairings cover the junction mechanisms. For example, there are various fairing types which aerodynamically cover wing flap movables (examples for a junction mechanism) such that the fairing can be moved together with the flap. On conventional aircraft, the moveable fairing is fixed to a main lever of the wing flaps by brackets which are fastened to the structural elements.

SUMMARY OF THE INVENTION

The invention aims to improve the attachment of fairings for junctions of airfoil bodies with regard to reduce weight and costs.

According to a first aspect, the invention provides an arrangement comprising: an airfoil body and a fairing for aerodynamically covering at least a part of a junction mechanism connecting the airfoil body to a support element of an aircraft, the fairing having a cover element covering a trailing end portion of the fairing, wherein the cover element is attached to the trailing edge of the airfoil body by a form fit connection.

Preferably, the arrangement comprises also the junction mechanism for connecting the airfoil body to a support element of an aircraft.

Preferably, the form fit connection comprises a male-female interlock joint, wherein one of a leading end of the cover element and the trailing edge of the airfoil body has a female connecting part and the other of the leading end of the cover element and the trailing edge of the airfoil body has a male connecting part inserted into the female connecting part.

Preferably, the form fit connection is a tongue and groove connection wherein one of the leading end of the cover element and the trailing edge of the airfoil body has a groove and the other of the leading end of the cover element and the trailing edge of the airfoil body has a tongue inserted into the groove.

Preferably, the tongue and groove connection extends over at least a major part of the width of the fairing measured in a spanwise direction of the airfoil body.

Preferably, the tongue is thicker than the groove so that it can be clamped within the groove in order to provide a press-fit connection.

Preferably, the leading end of the cover element has the groove, and the tongue is formed by the trailing edge of the airfoil body, and an aerodynamic sealing seals a transition area between the airfoil body and the cover element.

Preferably, the form fit connection is configured to bear at least the majority or all of the vertical loads in the connection region. Further, an additional fixation device may be provided to bear loads in the spanwise and/or chordwise directions.

Preferably, the additional fixation device comprises a fastener. Preferably, the additional fixation device comprises a shear pin. Preferably, the additional fixation device comprises a snap-fit connection. Preferably, the additional fixation device comprises a projection on one of the cover element and the airfoil body inserted in a recess on the other of the cover element and the airfoil body. Preferably, the additional fixation device comprises a strip on one of the cover element and the airfoil body inserted into a complementary channel recess of the other of the cover element and the airfoil body. The strip and the channel recess which is complementary to the strip may extend in any one of the chordwise or spanwise directions.

Preferably the airfoil body is a flap of a high lift device. Especially, the flap is to be connected to a trailing end region of a wing of an aircraft, wherein a junction for connecting the flap in a movable way to the wing structure is aerodynamically covered by the fairing. However, the attachment concept is also suitable for other aerodynamic surfaces which use fairings.

Preferably, a rear attachment of a flap fairing is provided at the far end of the flap. A forward attachment can be provided in a conventional manner, for example in the region of a linkage joint where the flap is rotationally linked to a lever or another movable support element.

According to a further aspect, the invention provides an aircraft, comprising an arrangement according to any of the aforementioned embodiments.

According to another aspect, the invention provides a method for installing the fairing to the airfoil body of the arrangement of any of the aforementioned embodiments, the installation method comprising moving the fairing and the airfoil body relatively to each other in order to insert one of the trailing edge of the airfoil body and the leading end of the cover element into the other of the trailing edge of the airfoil and the leading end of the cover element and deforming at least one of the trailing edge of the airfoil body and the leading end of the cover element by the insertion so that a reaction force causes the trailing edge and the leading end to be clamped together.

Preferably, the method comprises linearly moving the airfoil body and the fairing relative to each other in order to engage the form fit connection to provide a rear attachment.

Preferably, the method comprises rotating the airfoil body and the fairing relative to each other in order to engage the form fit connection to provide a rear attachment.

Preferably, the method comprises displacing the airfoil body and the fairing linearly relative to each other in order to engage the form fit connection to provide a rear attachment and in order to align a faring attachment point at a front part of the fairing with a body front attachment point on a bracket fixed to the airfoil body to provide a front attachment.

Preferably, the method comprises rotating the airfoil body and the fairing relative to each other in order to engage the form fit connection to provide a rear attachment and in order to align a faring attachment point at a front part of the fairing with a body front attachment point on a bracket fixed to the airfoil body to provide a front attachment.

Preferred embodiments of the invention relate to a flap moveable fairing attached by a form fit connection. Preferred embodiments relate to an attachment concept of a fairing on a flap or wing on the trailing edge with the use of form fit.

Preferred embodiments avoid or at least essentially reduce the use of fasteners for fastening a fairing for an airfoil body. Preferred embodiments provide one or several of the following advantages:

- Lower weight. As a rear attachment is realized at the far end of the airfoil body, the distance between attachment points increases. Thus, the momentum arm increases and the load couple to cope with the moment on the fairing decreases. This allows a light weight design on both the fairing itself and the airfoil body, e.g., the flap, to which it is connected.
- Reduced cost due less parts and less assembly time.
- Reduced weight since there is no need for local load introduction with local brackets or reinforcements.
- High rate capability due to very fast installation.
- Improvement with regard to maintenance time and reduction of maintenance effort.

Preferred embodiments of the invention are especially suitable for fairings which rotate together with an associated flap. Preferably, the fairing is connected to the flap or to a structure which has the same motion as the flap. The attachment concept is, however, also possible on other aerodynamic surfaces which use fairings.

BRIEF DESCRIPTION OF THE DRAWINGS

Embodiments of the invention are now explained in more detail with reference to the accompanying drawings in which.

DETAILED DESCRIPTION OF THE PREFERRED EMBODIMENTS

Figure 1:
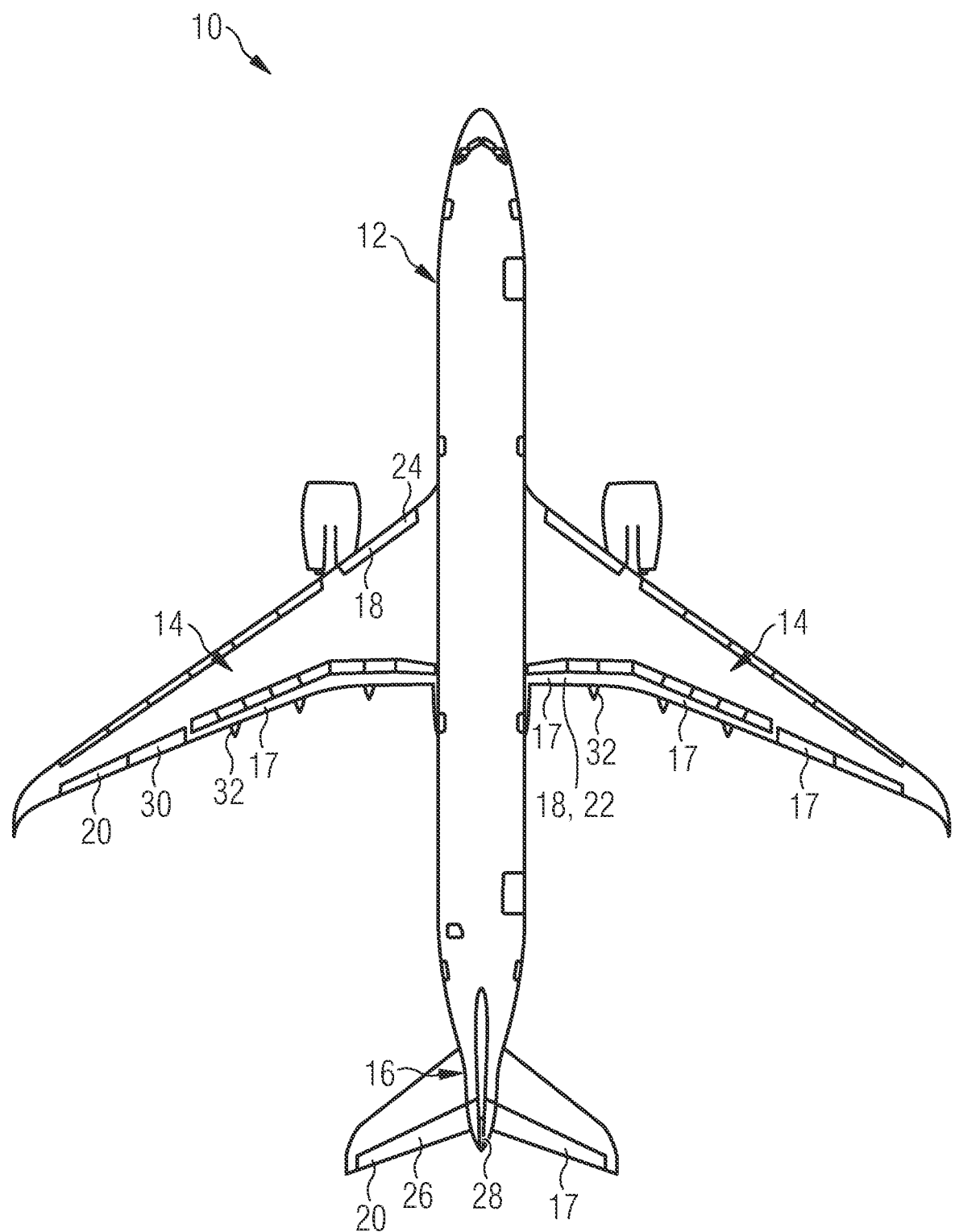
FIG. 1 is schematic top view on an aircraft having a high-lift system using flaps at the trailing edges of wings.

FIG. 1 depicts an aircraft 10 according to an embodiment of the invention. The aircraft 10 in a manner known per se comprises a fuselage 12 and a pair of wings 14 attached thereto. The aircraft 10 also includes a tail plane section 16. The aircraft 10 has several airfoil bodies 17 in the form of high-lift devices 18 and control surfaces 20. The high-lift device 18 may be any of a flap 22 or a slat 24. The control surface 20 may be any of an elevator 26, a rudder 28, and an aileron 30. Furthermore, at least one fairing 32 aerodynamically covers a junction mechanism (not shown in FIG. 1) connecting one of the airfoil bodies 17 to a support element of the aircraft 10. In the embodiment shown, several fairings 32 cover junction mechanisms connecting flaps 22 to a structure of the wing 14.

Figure 2:
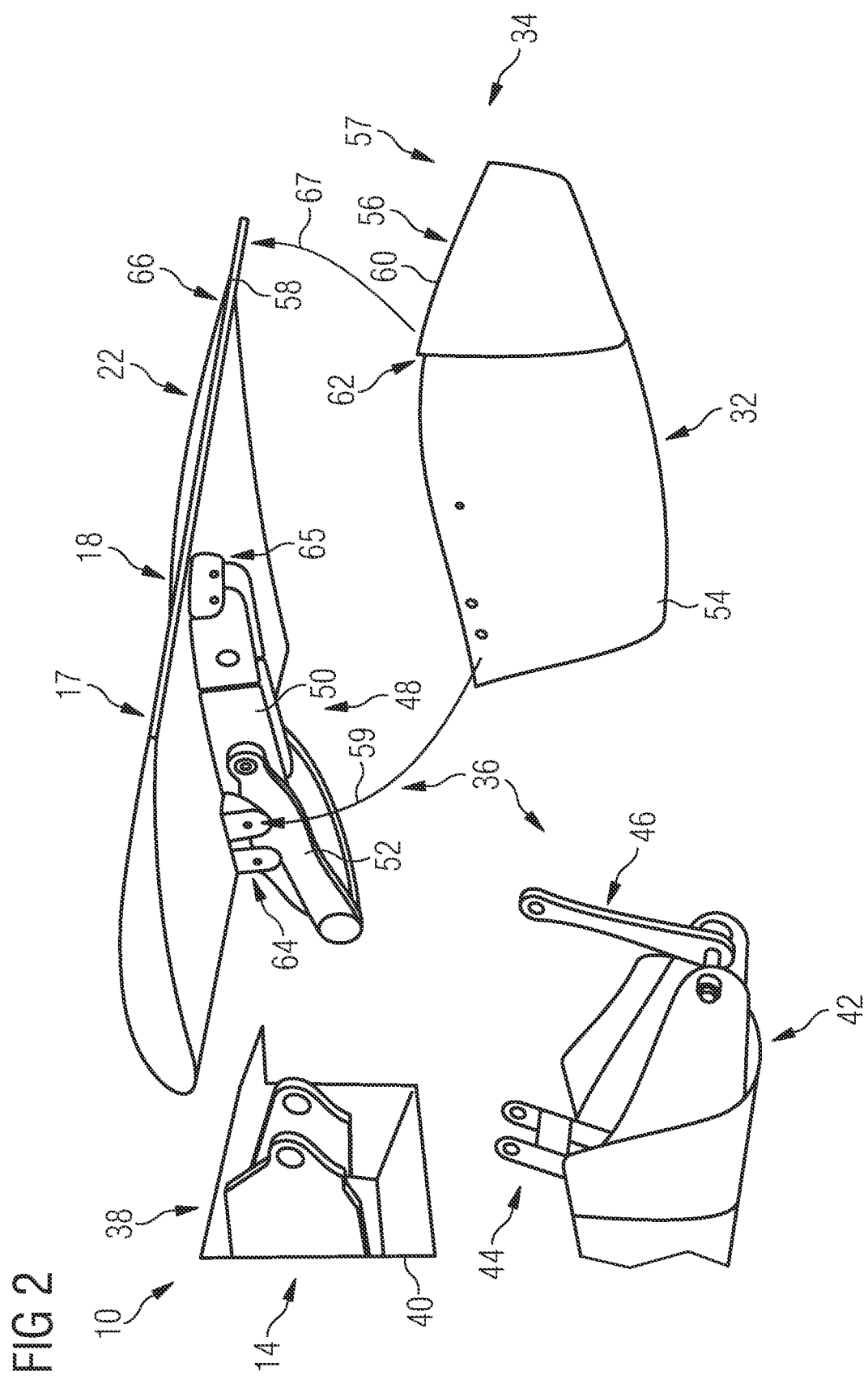
FIG. 2 is a perspective exploded view of an example of an arrangement comprising one flap, a junction mechanism for connecting the flap to a support element of the aircraft and a fairing.

FIG. 2 depicts an example for the junction mechanism 36 for connecting the flap 22 to a support element 38 on the structure 40 of the wing 14 and an embodiment of an arrangement 34 comprising the airfoil body 17, here in form of one of the flaps 22, and the fairing 32 configured to be attached to the airfoil body 17 and configured to cover at least a rear part of the junction mechanism 36. The junction mechanism 36 itself may also be part of the arrangement 34.

The junction mechanism 36 includes a flap moving mechanism 42 for moving the flap 22 between an extended position and a retracted position. In the embodiment shown, the flap moving mechanism 42 includes a first lever 44 and a second lever 46 wherein the levers 44, 46 are connected to a linkage joint 48 fixed to the flap 22. The linkage joint 48 includes a bracket 50 fixed to the body of the flap 22 and a lever arm 52. A free end of the second lever 46 is rotatably connected to the bracket 50. One end of the lever arm 52 is rotatably connected to the bracket 50, while the second end of the lever arm 52 is rotatably connected to the free end of the first lever 44. The flap moving mechanism 42 is configured to move the flap 22 by actuation of movement of the first and second levers 44, 46. Of course, the flap moving mechanisms 42 can have any other suitable construction using other linkages and/or sliding elements and/or gear elements for moving the flap 22 connected thereto.

The fairing 32 comprises a hollow portion 54 and a cover element 56. The hollow portion 54 is configured to receive at least a part of the junction mechanism 36. In the present embodiment, the hollow portion 54 receives, in the retracted flap position, the rear end of the flap moving mechanism 42 including the levers 44, 46 and the linkage joint 48. The cover element 56 covers a trailing end portion 57 of the fairing 32 extending over the trailing edge 58 of the flap 22 in the rearward direction (against flight direction). In the present embodiment the cover element 56 includes a cover plate 60 with a leading end 62 extending parallel to the trailing edge 58. The cover plate 60 may be an integral part of the trailing end portion 57 of the fairing 32 or a separate part fixed as top cover to the U-shaped hollow portion 54.

A front attachment 59 of the fairing 32 is realized in a conventional manner by attaching side walls of the hollow portion 54 to the linkage joint 48. In the present case, the side walls of the hollow portion 54 are connected at a front attachment point 64 by bolts or other suitable means (not shown) to the bracket 50.

In conventional aircraft, the fairing 32 is further attached at a rear attachment point 65 on the bracket 50. The conventional rear attachment point 65 at the bracket 50 is often quite close to the forward attachment point 64, especially for outer flaps. According to the shown embodiment, a rear attachment 67 of the fairing 32 is realized by connecting the cover element 56 of the fairing 32 to the trailing edge 58 of the flap 22. Hence, a conventional rear attachment point 65 at the bracket 50 is replaced by a new attachment region 66 which is at the very trailing edge 58 of the flap 22. By increasing the distance between the forward and aft attachment 59, 67 the reaction loads between the flap 22 and the fairing 32 can be reduced. Further, with the new aft attachment, loads are introduced over a line—extending over the width of the fairing 32—instead of a concentrated load introduction via a bracket 50. Therefore, the load introduction is more evenly distributed, and local loads are lower.

Referring now to FIGS. 3 to 12, several embodiments of the arrangement 34 are shown wherein a rear attachment 67 of the fairing 32 to the flap 22 is realized by connecting the fairing 32 by a form fit connection 68 to the trailing edge 58 of the flap. The form fit connection 68 is configured as a male-female interlock joint wherein one of the leading end 62 of the cover element 56 and the trailing edge 58 of the airfoil body 17 has a female connecting part and the other of the leading end 62 of the cover element 56 and the trailing edge 58 of the airfoil body 17 has a male connecting part inserted into the female connecting part. The male-female interlock joint is formed as a tongue and groove connection 70 adapted to provide a positive locking of the leading end 62 and the trailing edge 58. Hence, the female connecting part is a groove 71 which extends in spanwise direction and the male connecting part is a tongue 72 to be inserted into the groove 71.

According to the embodiments shown in FIGS. 3, 4, 6-12, the forward end or leading end 62 of the cover plate 60 is split into a lower and upper plate portion 74, 76 with a gap therebetween forming the groove 71. According to an exemplary embodiment, the cover plate 60 is comprised of an upper and an lower plate which are fixed together, wherein the margins of the plates at the leading end 62 form the upper and lower plate portions 74, 76. According to another embodiment, the lower and upper plate portions 74, 76 can be integrally formed with a cover plate main body, for example by cutting or milling the groove 71 into the leading end 62 or by any other manufacturing method known as such. The tongue 72 is formed by the rear part of the flap 22 with the trailing edge 58. FIG. 5 shows an embodiment where the insert side (the male connection part, i.e., the tongue 72) is switched from the fairing 32 to the flap 22. This might be more beneficial concerning forming of steps for aerodynamic performance. However, there may be more challenges for manufacturing.

Figure 3:
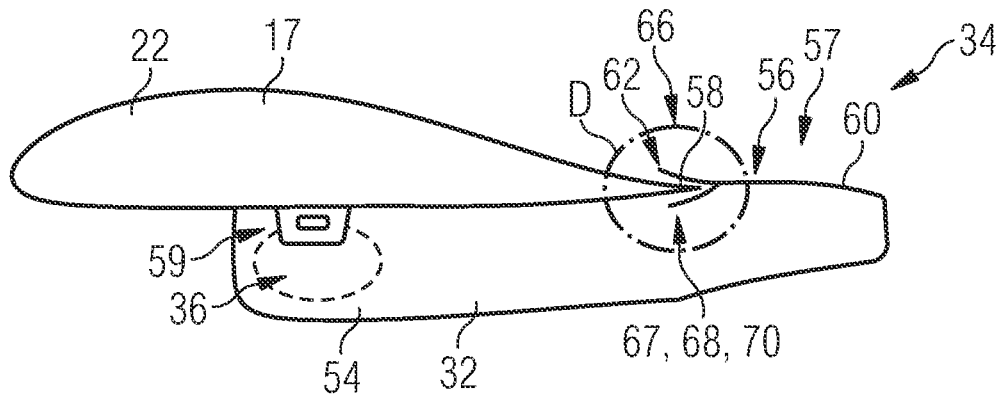
FIG. 3 is a schematic side view of a first embodiment of the arrangement.
Figure 4:
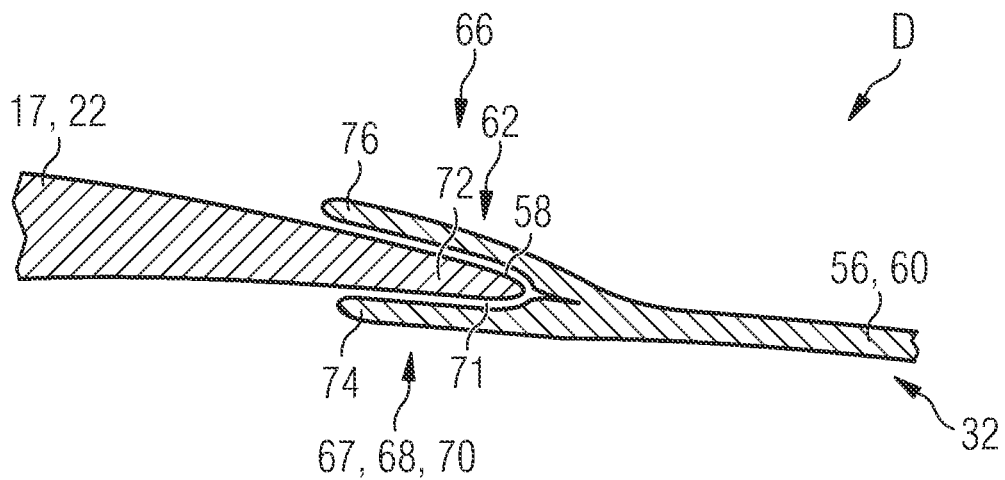
FIG. 4 is a schematic enlarged view of the detail D of FIG. 3 according a first embodiment.
Figure 5:
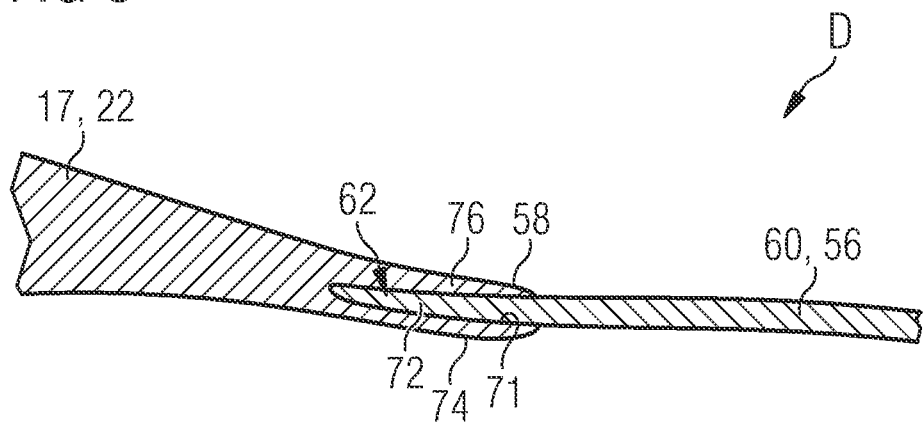
FIG. 5 is a schematic enlarged view of the detail D of FIG. 3 according a second embodiment.

FIGS. 3 and 4 depict a first embodiment which is now described in more detail. As mentioned before, the leading end 62 of the cover plate 60 has the lower and upper plate portion 74, 76. The rear end of the flap 22 including the trailing edge 58 can now be inserted into the cover plate 60 of the fairing 32. This is done by moving the fairing 32 to the flap 22. The flap trailing edge 58 is a bit thicker as the gap between the upper and lower plate portion 74, 76 of the fairing top cover. As such the flap trailing edge 58 pushes the plate portions 74, 76 a bit apart from each other. Because of this, a reaction force of the upper and lower plate portions 74, 76 causes a clamp connection in addition to the form fit connection 68. While the loads in vertical direction are taken by the form fit connection 68, loads in spanwise and/or chordwise direction are taken by the clamp connection.

In FIG. 5, a second embodiment is shown wherein the groove 71 is formed by splitting the rear portion of the flap 22 into the upper and lower plate portion 76, 74. The leading end 62 of the cover element 56 of the fairing is formed as tongue 72 to be inserted into the slitted trailing edge 58 of the flap 22. As in the first embodiment, loads in spanwise and chordwise direction are taking by a clamping force.

Figure 6:
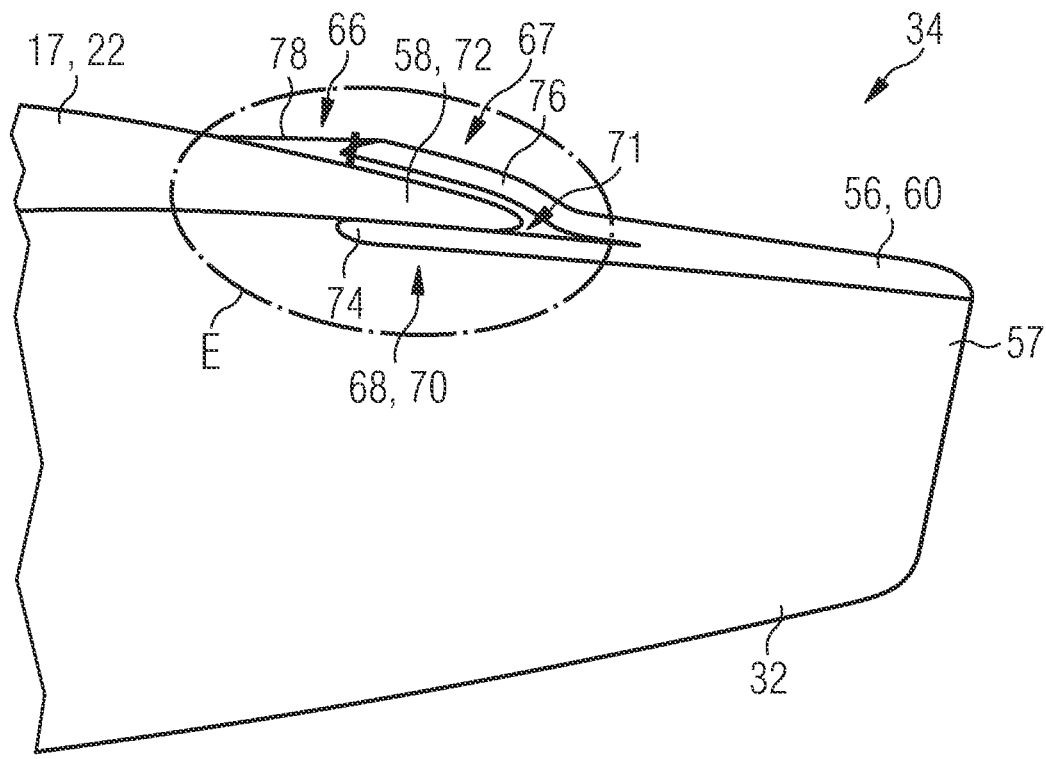
FIG. 6 is a schematic view of the rear attachment region for attaching the fairing to the flap of the arrangement according to a third embodiment.
Figure 7:
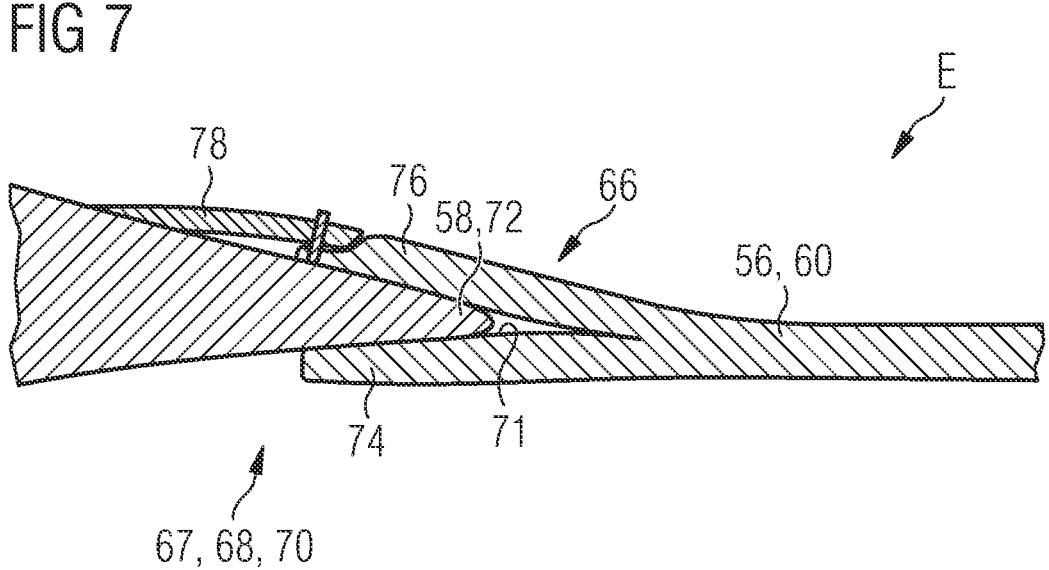
FIG. 7 is a schematic enlarged view of the detail E of FIG. 6.

FIGS. 6 and 7 depict a third embodiment of the rear attachment 67 between the fairing 32 and the flap of the arrangement 34. Instead of swapping the insert side from the fairing 32 to the flap 22 as this is done in the embodiment of FIG. 5, an aerodynamical seal 78 is added covering a step for a smooth transition between flap 22 and fairing 32. The aerodynamical seal 78 is added to the top side of the fairing cover plate 60.

According to the embodiments shown in FIGS. 8 to 11, the rear attachment 67 comprises a fixation device 80 for taking loads in the spanwise and/or chordwise direction while at least the major part of the vertical loads are taken by the form fit connection 68.

Figure 8:
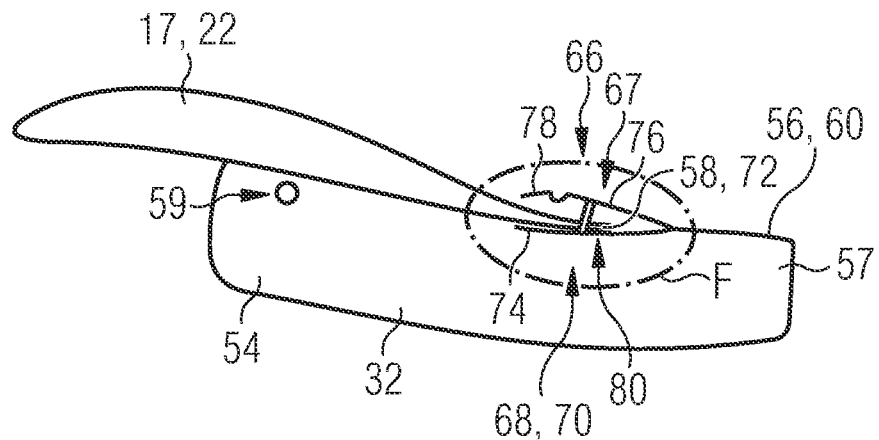
FIG. 8 is a view as in FIG. 6 showing a fourth embodiment of the arrangement.
Figure 9:
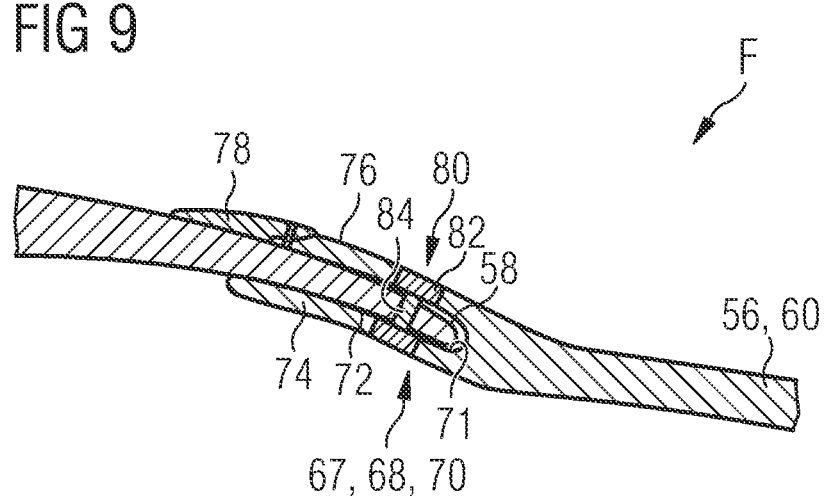
FIG. 9 is a schematic enlarged view of the detail F of FIG. 8.

FIGS. 8 and 9 depict a fourth embodiment wherein the fixation device 80 comprises fasteners 82 such as shear pins 84. A few fasteners 82 are used to fix the upper and lower plate portion 74, 76 of the cover element 56 of the fairing 32 with the trailing edge 58 of the flap 22. A major advantage of this is that the fasteners 82 can now take loads parallel to the trailing edge 58 and the form fit connection 68 takes the vertical loads. This way there is no need to take advantage of friction. Since the fasteners 82 take only minor loads, only a small amount is needed, and they can be very small and cost-effective. According to the embodiment depicted in the FIGS. 8 and 9, ends of the fastener 82 engage the lower and upper plate portions 74, 76 while a shaft of the fastener passes through a through hole in the trailing edge 58 of the flap. 22.

Figure 10:
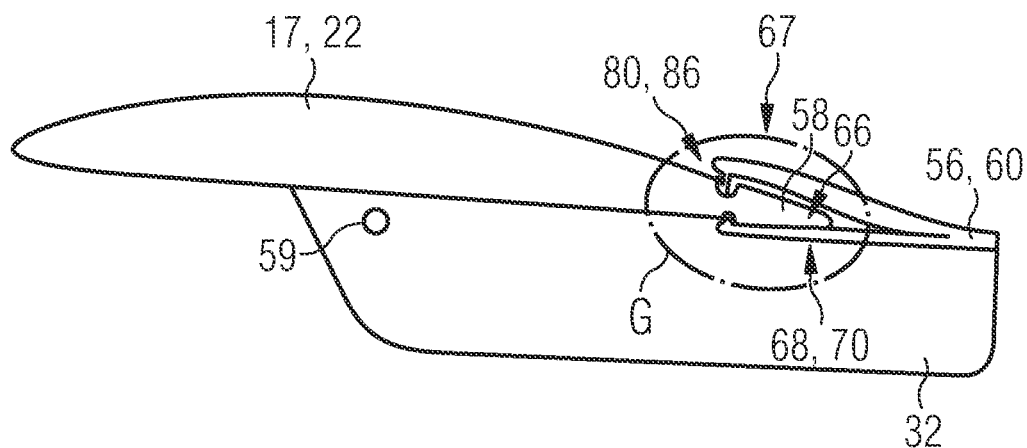
FIG. 10 is a view as in FIG. 6 showing a fifth embodiment of the arrangement.
Figure 11:
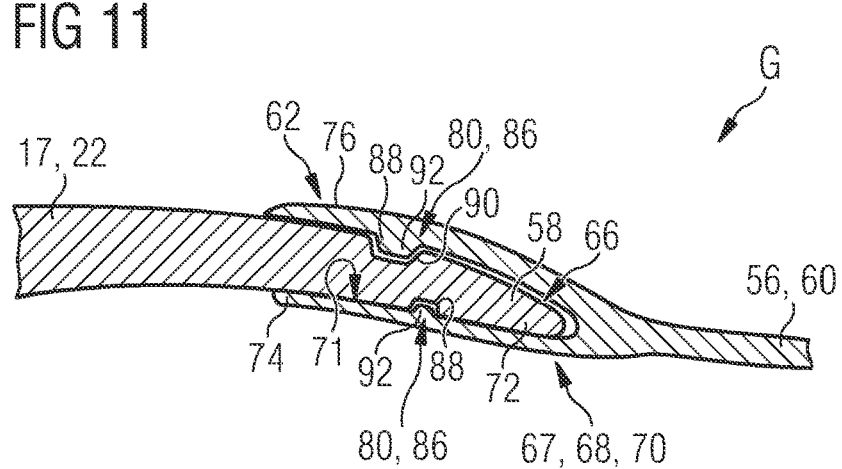
FIG. 11 is a schematic enlarged view of the detail G of FIG. 10.

FIGS. 10 and 11 depict a fifth embodiment wherein the fixation device 80 comprises a snap-fit connection 86. The snap-fit connection 86 comprises a projection 88 protruding from one of the cover element 56 and the trailing edge 58 and a complementary recess 90 in the other of the cover element 56 and the trailing edge 58. For example, the projection 88 protrudes from an inner side of the groove 71, and the recess is formed at a corresponding portion of the tongue 72, or vice a versa. For example, the snap-fit connection 86 extends longitudinally in one direction, e.g., perpendicular to a direction of loads to be taken. This can be realized by a series of projections and a complimentary series of recesses. In the embodiment shown, the projection 88 is a strip 92 on the lower side of the upper plate portion 76 which extends parallel to the trailing edge 58. The recess 90 is elongated complementary to the strip 92 and is formed on an upper side of the flap 22 such that the strip 92 can be received to provide the snap-fit connection 86. A corresponding structure is present at the lower side of the flap 22 and the upper side of the lower plate portion 74. In the exemplary embodiment shown in FIGS. 10 and 11, small strips 92 are arranged at the beginning of the upper and lower plate portions 74, 76 of the cover element 56 of the fairing 32. At the trailing edge 58 of the flaps 22, recesses 90 in span direction are applied. The strips 92 snap into the recesses 90, and a positive lock engagement is established. The strips 92 and recesses 90 can be continuous or have a teeth design, depending on the needs of the load transfer in the snap fix. Similar strips 92 can also be applied in chord direction (not shown). In other embodiments (not shown), several strips 92 are arranged so that they are not parallel to each other, or one or several non-linear strips 92. Hence, loads both in spanwise and chordwise directions can be transferred thereby. According to other embodiments (not shown), the snap-fit connection 86 is only present on either one of the upper and lower sides.

Figure 12:
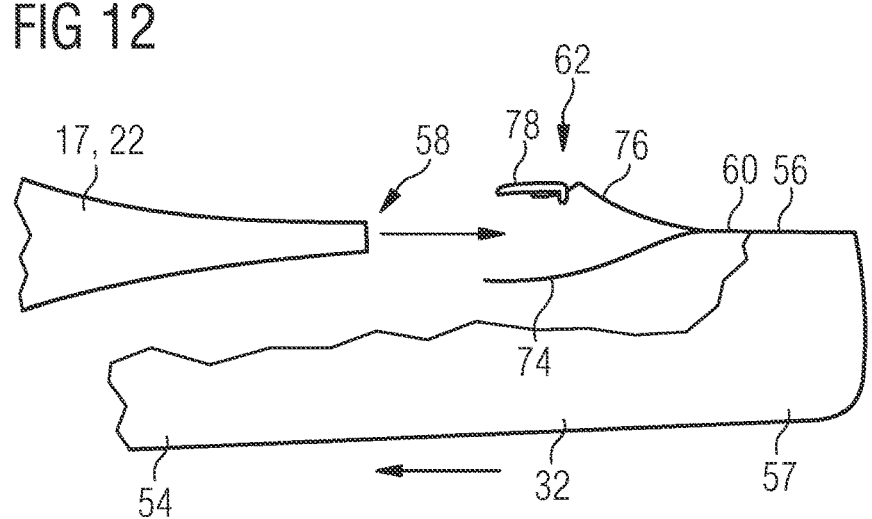
FIG. 12 is a schematic exploded view illustrating one possibility for an installation of the fairing to the flap.
Figure 13:
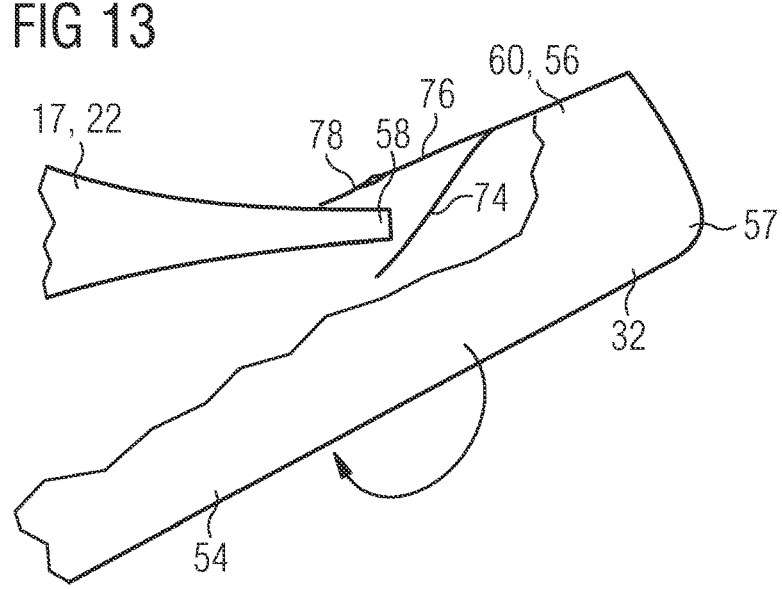
FIG. 13 is a schematic exploded view illustrating an alternative possibility for an installation of the fairing to the flap.

FIGS. 12 and 13 illustrate different embodiments of an installation method for attaching the fairing 32 to the flap 22. While the installation is shown and explained on basis of the third embodiment, it can be similar conducted for installation of any of the other embodiments.

FIG. 12 shows a first embodiment for the method using a translational movement for the installation. The fairing 32 is aligned more or less parallel behind the trailing edge of the flap 22 and then the fairing 32 is moved in a plane in the direction of the flap 22. This movement is conducted until the form fit connection 68 is engaged and the front attachment points 64 of the fairing 32 and the bracket 50 are aligned to each other so that the front attachment can be provided in the conventional manner by bolts or the like.

FIG. 13 shows a second embodiment for the method using a rotational movement. The fairing 32 is put on the tip of the trailing edge 58. An angular deviation between flap 22 and fairing 32 is allowed. Then the fairing tip rotated down and during the rotation the fairing 32 can be pushed slightly forward.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 fuselage
14 wing
16 tail plane section
17 airfoil body
18 high-lift device
20 control surface
22 flap
24 slat
26 elevator
28 rudder
30 aileron
32 fairing
34 arrangement
36 junction mechanism
38 support element
40 structure
42 flap moving mechanism
44 first lever
46 second lever
48 linkage joint
50 bracket
52 lever arm
54 hollow portion
56 cover element
57 trailing end portion
58 trailing edge
59 front attachment
60 cover plate
62 leading end
64 front attachment point
65 rear attachment point (in conventional aircraft)
66 rear attachment region (according to an embodiment of the invention)
67 rear attachment
68 form fit connection
70 tongue groove connection
71 groove
72 tongue
74 lower plate portion
76 upper plate portion
78 aerodynamical sealing
80 fixation device
82 fastener
84 shear pin
86 snap-fit connection
88 projection
90 recess
92 strip

The invention claimed is:

1. An arrangement comprising:
an airfoil body, and
a fairing aerodynamically covering at least a part of a junction mechanism connecting the airfoil body to a support element of an aircraft,
the fairing having a cover element covering a trailing end portion of the fairing,
wherein the cover element is attached to a trailing edge of the airfoil body by a form fit connection, and
wherein the junction mechanism is located forward of the trailing edge of the airfoil body and allows relative movement between the airfoil body and the support element.

2. The arrangement according to claim 1,
wherein the form fit connection comprises a male-female interlock joint,
wherein one of a leading end of the cover element and the trailing edge of the airfoil body has a female connecting part and the other of the leading end of the cover element and the trailing edge of the airfoil body has a male connecting part inserted into the female connecting part.

3. The arrangement according to claim 1, wherein the form fit connection is a tongue and groove connection wherein one of a leading end of the cover element and the trailing edge of the airfoil body has a groove and the other of the leading end of the cover element and the trailing edge of the airfoil body has a tongue inserted into the groove.

4. The arrangement according to claim 3, wherein the tongue and groove connection extends over at least a major part of a width of the fairing measured in a spanwise direction of the airfoil body.

5. The arrangement according to claim 3, wherein the tongue is thicker than the groove so that the tongue is clampable within the groove.

6. The arrangement according to claim 3, wherein the leading end of the cover element has the groove, the tongue is formed by the trailing edge of the airfoil body, and an aerodynamic sealing seals a transition area between the airfoil body and the cover element.

7. The arrangement according to claim 1, wherein the form fit connection is configured to bear vertical loads and wherein an additional fixation device bears loads in at least one of spanwise and chordwise directions.

8. The arrangement according to claim 7, wherein the additional fixation device comprises at least one of a fastener, a shear pin, a snap-fit connection, a projection on one of the cover element and the airfoil body inserted in a recess on the other of the cover element and the airfoil body, and a strip on one of the cover element and the airfoil body inserted into a groove-like recess of the other of the cover element and the airfoil body.

9. The arrangement according to claim 1, wherein a front portion of the fairing is additionally attached to a bracket fixed to a structural element of the airfoil body.

10. The arrangement according to claim 1, wherein the airfoil body is a flap of a high-lift system for an aircraft.

11. The arrangement according to claim 1, further comprising the junction mechanism for connecting the airfoil body to a support element of an aircraft.

12. An aircraft, comprising an arrangement according to claim 1.

13. A method for installing a fairing of the arrangement of claim 1 to an airfoil body, comprising:
    moving the fairing and the airfoil body relative to each other to insert one of a trailing edge of the airfoil body and a leading end of a cover element into the other of the trailing edge of the airfoil body and the leading end of the cover element, and
    deforming at least one of the trailing edge of the airfoil body and the leading end of the cover element by the insertion so that a reaction force causes the trailing edge and the leading end to be clamped together.

14. The method according to claim 13, comprising displacing the airfoil body and the fairing in a linear movement relative to each other in order to engage the form fit connection to provide a rear attachment.

15. The method according to claim 13, comprising rotating the airfoil body and the fairing relative to each other in order to engage the form fit connection to provide a rear attachment.

16. An arrangement comprising:
    an aircraft support element;
    one of an elevator, a flap, a slat, an elevator, a rudder, or an aileron
    a moving mechanism joining the one of the elevator, the flap, the slat, the elevator, the rudder, or the aileron to the aircraft support element, the moving mechanism allowing relative movement between the aircraft support element and the one of the elevator, the flap, the slat, the elevator, the rudder, or the aileron;
    a fairing aerodynamically covering at least a part of the moving mechanism, the fairing having a cover covering a trailing end portion of the fairing,
    wherein the cover element is attached to a trailing edge of the one of the elevator, the flap, the slat, the elevator, the rudder, or the aileron by a form fit connection.

\* \* \* \* \*